Aug. 22, 1939. A. GENTILINI 2,170,368
ILLUMINATED ADVERTISING APPARATUS WITH A SCINTILLATING EFFECT
Filed July 30, 1936
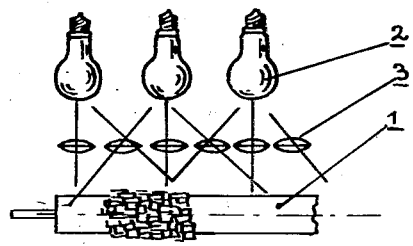
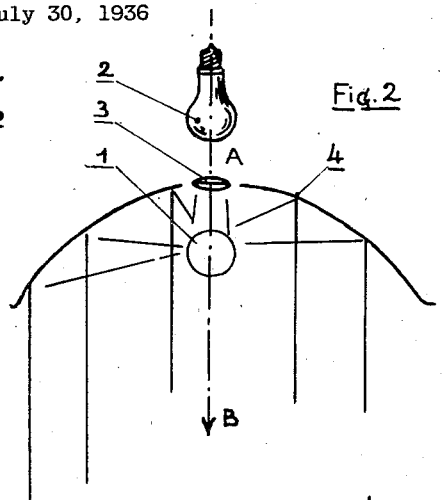
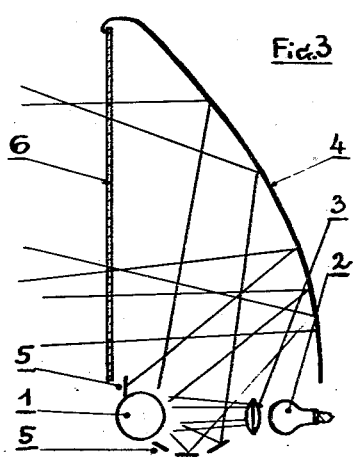
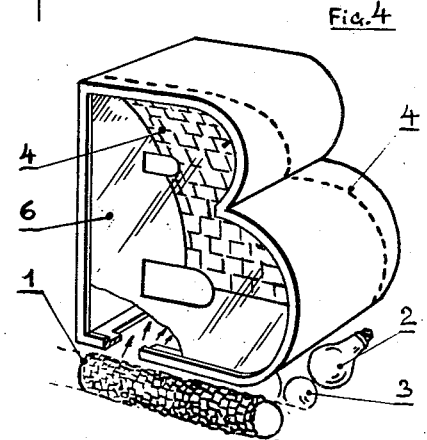
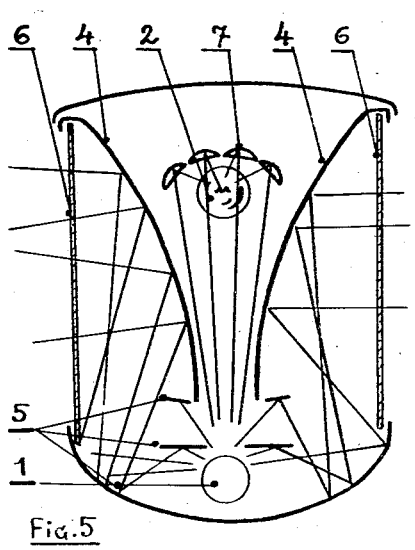
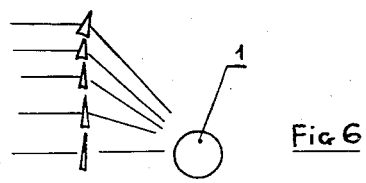
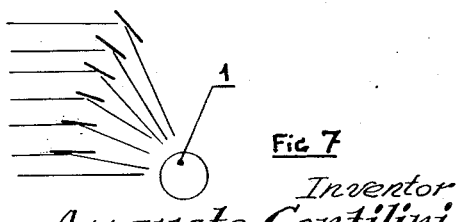
Inventor
Augusto Gentilini
By Raymond A. ...
Attorney Patented Aug. 22, 1939

2,170,368

UNITED STATES PATENT OFFICE 2,170,368

ILLUMINATED ADVERTISING APPARATUS WITH A SCINTILLATING EFFECT

Augusto Gentilini, Rome, Italy

Application July 30, 1936, Serial No. 93,363
In Italy July 29, 1935

5 Claims. (Cl. 40—130)

My present invention consists essentially in a device capable of producing instantaneous variations of lights irregularly disposed on a given surface so as to produce a kind of scintillation sufficiently luminous and continuously variable, capable of attracting attention even at great distances.

With these and other objects in view which will become apparent from the following detailed description the invention is shown in the drawing in which:

Figure 1 is a partial elevational view of the invention.

Figure 2 is a diagrammatic view of a modification.

Figure 3 is a diagrammatic view of a further modification of the invention.

Figure 4 is a perspective view of the modification shown in Figure 3 with the parabolic surface limited to the figure itself.

Figure 5 is a diagrammatic view of a further modification having two surfaces.

Figure 6 is a diagrammatic view of a modification in which prisms are used.

Figure 7 is a diagrammatic view illustrating the use of mirrors in place of the parabolic surface.

The device, represented schematically in the attached drawing, consists principally of a rotary cylinder 1 which carries a large number of small reflecting surfaces, arranged as far as possible in an irregular manner.

A lamp or a series of lamps 2 projects light on the cylinder. In the case represented in Figure 1, lenses 3 are provided to concentrate the light, but it is possible to use in their place, for example, parabolic mirrors not shown in the drawing or even to dispense with any concentrating device.

The moving luminous rays produced by the cylinder 1 have, naturally, different directions which are continuously variable. In order to direct them all together in a given direction toward the observer, an assembly of reflecting surfaces (of which some are obscurable at will so as to form designs and inscriptions) is arranged following the parabolic curve 4 so as to redirect the rays as indicated in Figure 2.

The cylinder 1 is arranged at one of the foci of the parabola, the other being at infinity, and because of this, an observer at a distance along the axis A—B will see all the surface of the parabola illuminated but because of the irregularity of the surfaces on the cylinder 1 and the surfaces arranged around 4 being also somewhat irregular, this curve will appear to be illuminated irregularly and with the effect of violent scintillations. An apparatus thus realised can only be noticed along the axis A—B. In order to increase the useful angle, it is advisable to multiply by successive reflections the image of the cylinder 1. Figure 3 shows one of the practical embodiments of the invention; 4 is a part of a parabolic curve; 5 are reflecting surfaces which multiply the image of the cylinder 1 by directing into the parabola the luminous rays which do not proceed exactly from the focus of the parabola. Because of this, the apparatus can be observed from different view points. 6 represents a glass on which is applied the figure or inscription to be noted or it may be a non-transparent plate in which is cut the figure or the inscription. The figure may also be formed on the parabolic surface, or, even better, the parabolic surface can be limited to the inside of the figure or the inscription, Figure 4.

As shown in Fig. 4 the casing is in the form of the letter B and the front wall 6 being a glass stencil. The rear wall 4 has the curvature of a parabola and is provided with numerous reflecting surfaces. The rear wall has also the outline of the letter B. The bottom is open as shown in Fig. 3.

In Figure 5 is represented the case of a sign with two faces using a novel optical arrangement. One sees in this arrangement, a device for the concentration of light which is realised by means of concave mirrors 7 mounted on a surface essentially concave. Besides, part of the mirrors 5 for the multiplication of the image of the cylinder 1 are arranged according to a concave surface and in such form that it includes and completes the curve 4. In effect, and as can be seen in Figure 5, at all points of the parabola 4 at which is indicated schematically and approximately a luminous ray, at least two images of the cylinder 1 are formed. In Figures 6 and 7 are represented two cases of redirection of the rays by means of non-parabolic surfaces or in other words by prisms and differently inclined mirrors. In the first case the angle of refraction of the prisms varies according to a parabolic function; in the second case, they operate always from a broken parabolic curve. The cylinder 1 may be variously coloured so as to produce even more complex effects or colours may be applied between the luminous source and the cylinder. The motion of the cylinder can be obtained beside the usual methods also by utilising the hot air produced by the lamps.

Having now particularly described and ascertained the nature of my said invention and in what manner the same is to be performed, I declare that what I claim is:

1. A device for producing scintillating indicia which comprises a source of light, a rotatable cylinder, a plurality of reflecting surfaces irregularly disposed on the periphery of said cylinder, a lens disposed in the line between said source of light and said cylinder for concentrating the beam from said source of light upon the periphery of said cylinder, and a parabolic reflecting surface disposed behind said cylinder, said cylinder, source of light, and parabolic reflecting surfaces being disposed in suitable juxtaposition.

2. A device for producing scintillating indicia which comprises a source of light, a rotatable cylinder upon which said light is directed, a plurality of reflecting surfaces irregularly disposed on the periphery of said cylinder, and a parabolic reflecting surface disposed behind said cylinder, said cylinder being placed at the focus of said parabolic reflecting surface.

3. A device for producing scintillating indicia which comprises a source of light, a rotatable cylinder, a plurality of small reflecting surfaces irregularly disposed on the periphery of said cylinder, a parabolic reflecting surface having the configuration of a desired indicium, said parabolic surface being disposed above said source of light and behind said cylinder; and a transparent plate in front of said parabolic surface.

4. A device for producing scintillating indicia comprising a source of light, a concentrating lens disposed in front of said source of light, a rotatable cylinder disposed in front of said lens, a plurality of small reflecting surfaces irregularly disposed on the periphery of said cylinder, a frame disposed above said cylinder, the back of said frame consisting of a parabolic reflecting surface of a configuration corresponding to that of the desired indicia, the front of said frame consisting of a transparent plate.

5. A device according to claim 4 in which a plurality of auxiliary nerves are disposed about said cylinder, whereby light reflected from said cylinder is concentrated upon said parabolic reflecting surface.

AUGUSTO GENTILINI.